Aug. 29, 1939.   J. W. B. PEARCE   2,171,313
UNIVERSAL JOINT
Filed Oct. 2, 1935   2 Sheets-Sheet 2
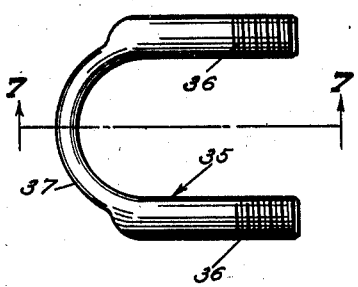
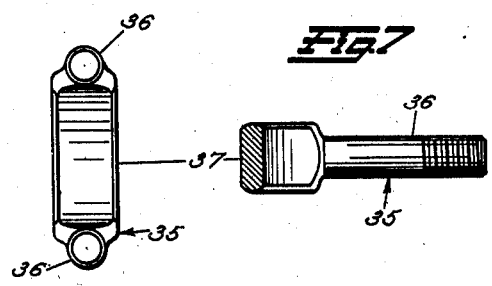
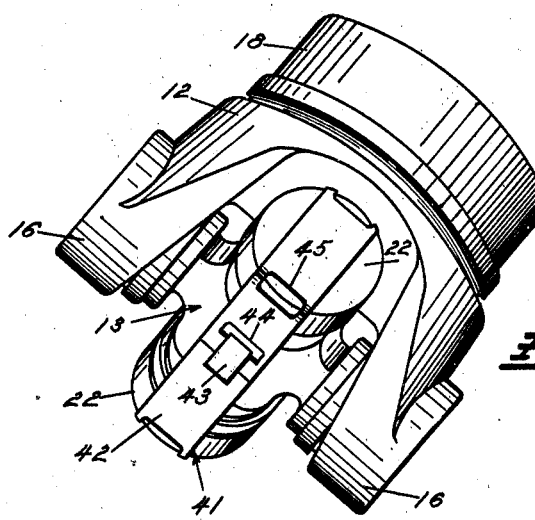
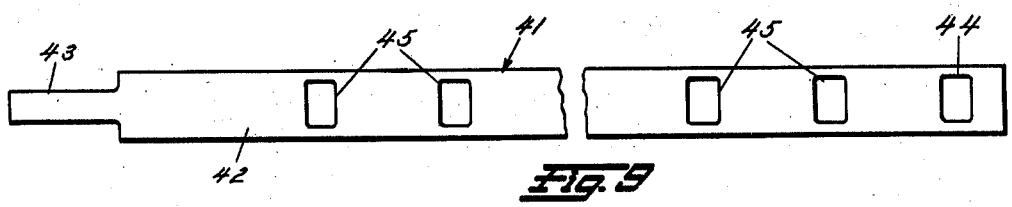
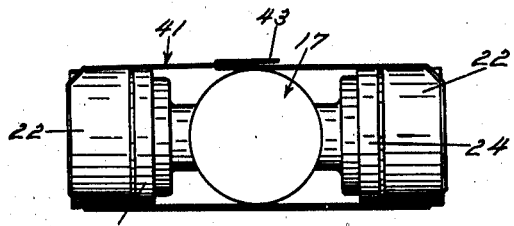
Inventor
John W. B. Pearce
By Strauch & Hoffman
Attorneys Patented Aug. 29, 1939

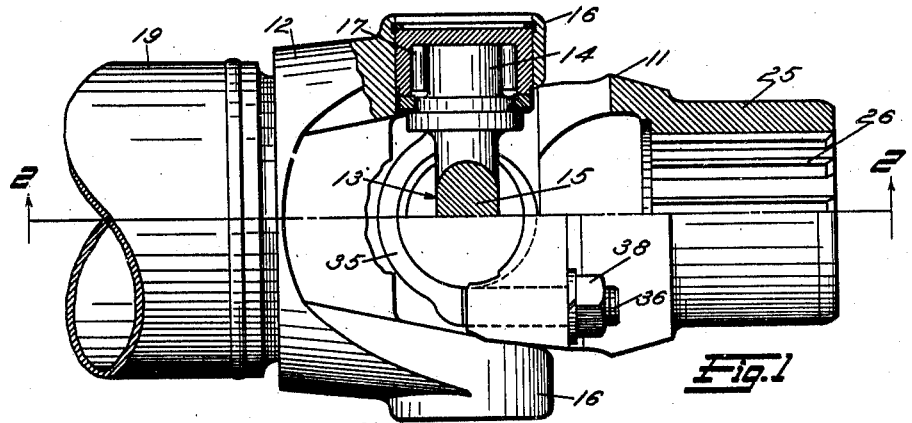
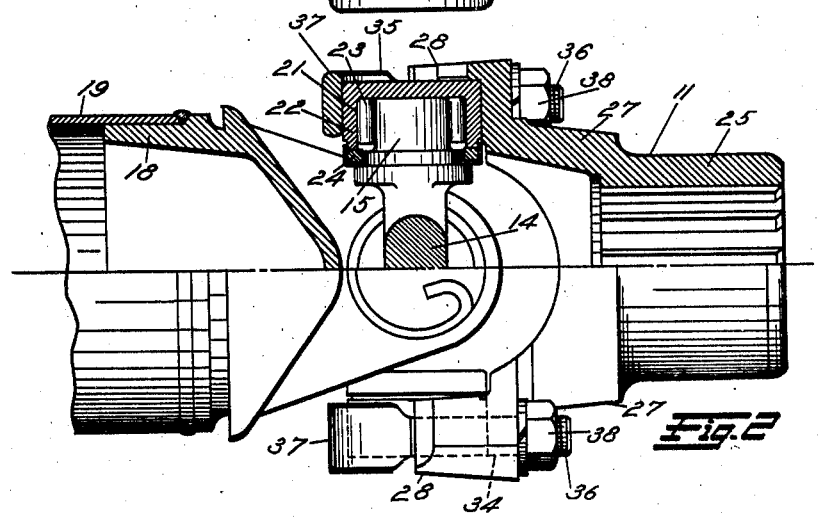
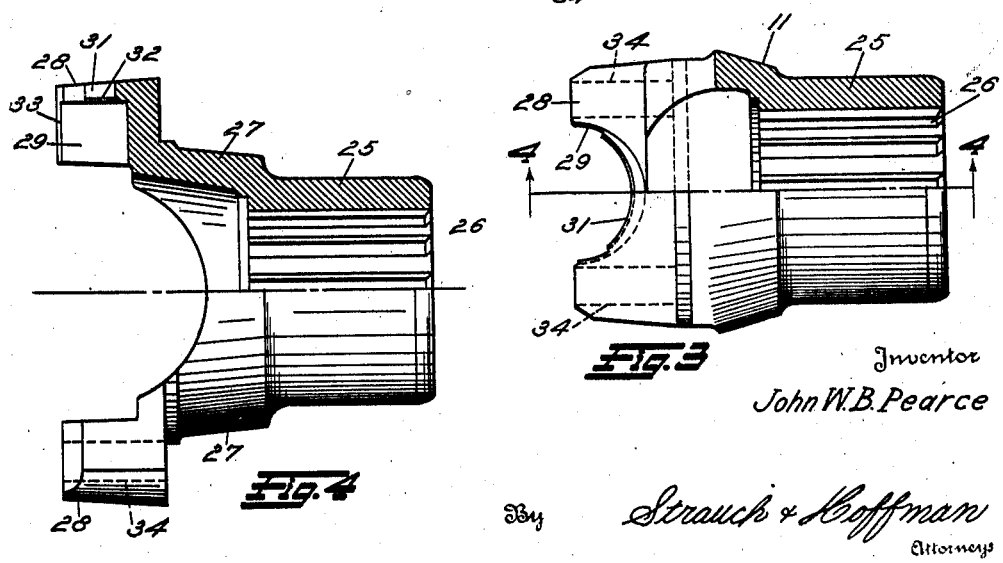

2,171,313

UNITED STATES PATENT OFFICE 2,171,313

UNIVERSAL JOINT

John W. B. Pearce, Toledo, Ohio

Application October 2, 1935, Serial No. 43,266

2 Claims. (Cl. 64—17)

The present invention relates to universal joints and more particularly relates to drive couplings for transmitting power from one drive member or shaft to another at an angle thereto.

In universal joints of the type commonly used on automotive vehicles for transmitting power from the transmission to the differential, it is common practice to provide a pair of yoke members having spaced arms for receiving the trunnions of a spider or cross element. The arms of the yoke members are usually formed either with integral aligned ring portions in which the spider trunnions are journaled, or are formed with flat end surfaces to which bearing units, for accommodating the trunnions, are detachably secured.

The present invention embraces an improvement on the foregoing types of coupling by providing at least one yoke member with arms having semi-cylindrical end surfaces formed to provide aligned recesses or pockets within which the trunnion bearing elements are detchably secured by means of U-bolts, and further formed with stop shoulders or flanges for automatically retaining the bearing elements in proper radial position on the spider with respect to the joint center.

The construction provided by the present invention facilitates assembly and dismantling of the joint since the end yoke may be inserted or withdrawn in an endwise direction with respect to the spider of the joint, thereby eliminating intricate assembling operations and permitting assembly of the end yoke on the spider without disturbing the bearing units which may be previously assembled on the spider trunnions. Accurate adjustment and alignment of the bearing units is insured by virtue of the recesses or pockets in the arms of the end yoke and by virtue of the shoulder or stop flanges thereon formed, thus eliminating the need for special alignment tongues or keys. The construction further eliminates the need for specially shaped bearings and is adapted to the economical cup-shaped form of blind end bearing thus insuring a light, compact and economical design.

A further advantage of the present construction resides in its adaptability to compact assembly for shipment. With the spider assembled in one yoke member, bearing units may be assembled upon the free spider trunnions and secured in place by means of a shipping strap looped thereabout. The universal joint when thus packed for shipment is completely assembled with the exception of the end yoke member, and provides a compact unit which may conveniently be shipped. When it is desired to complete the assembly, the shipping strap may be removed and an end yoke, of the improved form provided by the present invention, may be mounted on the bearing units carried by the free trunnions and secured in place by U-bolts. These operations may be performed with great speed and facility in making the final assembly upon installation. The other assembly operations are performed at the factory, including the packing of lubricant for the life of the joint. The advantages of the construction and mode of shipment are thus manifest.

A primary object of the invention resides in the provision of a universal joint having a yoke member which may be assembled with respect to the trunnion cross in an endwise direction without disturbing the joint bearing units, which may be previously assembled on the trunnion cross.

A further object of the invention resides in the provision of a universal joint having bearing units which may be packed with lubricant and assembled on the trunnion cross at the factory and which will be undisturbed by subsequent simple assembly operations of other parts of the joint.

Still another object of the invention resides in the provision of a universal joint of a novel construction designed to facilitate shipment in substantially complete assembled condition.

Another object of the invention is to provide a novel partially-assembled universal joint having means to maintain the parts thereof temporarily in assembled relation during transportation of said joint to the point of final assembly.

Another object of the invention lies in the provision of an improved method of preparing the parts of a universal joint for shipment by which the packing of the joint with lubricant and substantially all of the assembly operations may be performed at the factory in which the joint is produced.

Further objects of the invention will appear in the following description when considered together with the accompanying drawings in which like reference characters are employed to denote like parts throughout the several views. In the drawings:

Figure 1 is a view partly in section and partly in elevation showing a preferred embodiment of the present invention.

Figure 2 is a view partly in section and partly in elevation taken substantially along line 2—2 of Figure 1.

Figure 3 is a view partly in section and partly in elevation showing the end yoke, forming part of the present invention, in the position shown in Figure 1.

Figure 4 is a view partly in section and partly in elevation taken substantially along line 4—4 of Figure 3.

Figure 5 is a plan view showing a U-bolt forming part of the present invention.

Figure 6 is an end view of the U-bolt shown in Figure 5.

Figure 7 is a sectional view taken substantially along line 7—7 of Figure 5.

Figure 8 is a perspective view showing a preferred embodiment of the present invention packed for shipment.

Figure 9 is a plan view showing a preferred form of shipping strap forming a part of the present invention.

Figure 10 is a view showing the method of assembling a shipping strap about a pair of bearing units mounted on the trunnions of a spider.

Referring to the drawings, the universal joint embodying the present invention comprises a yoke 11, a yoke 12, and a spider or cross 13 having a pair of trunnions 14 upon which yoke 12 is mounted, and a second pair of trunnions 15 upon which yoke 11 is mounted when the parts are assembled.

Yoke 12 is of a form known in the art and includes a pair of spaced arms formed at their free ends into aligned ring portions 16 designed to accommodate bearing units indicated generally at 17, within which trunnions 14 are journaled. The yoke arms are formed upon a sleeve portion 18 telescoped within, and secured for rotation with a suitable shaft as, for example, the tubular propeller shaft 19 of an automotive vehicle.

Mounted upon the end of each trunnion 15 is a bearing unit 21, similar to bearing units 17 on trunnions 14. Each bearing unit is of a form known in the art. Briefly, each unit 21 includes a cup-shaped bearing race 22 provided with needle bearings 23 within which the trunnion is journaled, and a ring gasket assembly 24 seated upon a shoulder formed at the base of the trunnion and designed to prevent leakage of lubricant out of bearing race cup 22 along the trunnion surface. Bearing race cups 22 are adapted to be secured with respect to end yoke 11 which is designed in the following manner.

End yoke 11 includes a sleeve portion 25 provided with either internal splines 26, taper, or other fitting designed for suitable engagement with mating fitting formed on the end of a suitable driving or driven shaft (not shown). Splines 26 provide for axial movement of yoke 11 relative to said driving or driven member when the axes of said yoke and member assume an angular position relative to each other during rotation of the joint. Extending away from sleeve 25 in opposite directions are two arms 27 which terminate, as indicated at 28, in substantially spaced relation with respect to each other.

The terminus of each arm 27 is provided with a recess or pocket 29 which is preferably semi-cylindrical in shape, the pockets 29 in the two arms being aligned along an axis substantially normal to the axis of sleeve 25. Extending partially around the periphery of each pocket at the outer axial end thereof is a preferably crescent-shaped abutment flange or shoulder 31 which defines the outer axial limit of the pocket and functions in a manner presently set forth. As seen in Figures 1 and 3, shoulder 31 is of a maximum width adjacent the bottom of pocket 29, and tapers away to a minimum width adjacent the top of the pocket.

The edge of shoulder 31 bordering on pocket 29 may be chamfered as at 32, and the top edges of pocket 29 may be chamfered as at 33. Each arm 27 at each side of pocket 29 is provided with a bore 34. Said bores extend parallel to the axis of sleeve 25 and are designed to receive the legs of a U-bolt 35 presently to be described. As seen in Figures 1 and 2, when yoke 11 is assembled with respect to cross 13, the aligned pockets 29 in the yoke arms receive the bearing cups 22 mounted on trunnions 15, and abutment shoulders 31 function to properly position the cups with respect to the center of the cross.

Each bearing cup 22 is retained within its pocket 29 by means of a U-bolt 35 having legs 36 which project through the bores 34 in the yoke arm, and having a preferably semi-cylindrical flattened bridge portion 37 designed to encompass that part of the bearing cup extending outside of pocket 29. It will be observed that the area of the portion 37 is sufficient to substantially cover the side of the bearing cup and to completely cover the side of the cup opposite the bottom wall. As seen in Figures 5, 6 and 7, legs 36 of the U-bolt are provided with threaded extremities which project outwardly from bores 34 to the rear of the yoke arms. Nuts 38 are turned upon the threaded ends of the U-bolt into contact with the rear surface of the yoke arms and serve to draw the bridge portion of the U-bolt toward pocket 29 for rigidly clamping the bearing cup and insuring that yoke 11 will be securely assembled upon spider 13. It will be appreciated that when the joint is assembled the semi-cylindrical recesses defined by the bridge portions of the U-bolts define, with the pockets in the yoke arms, cylindrical apertures for seating the bearing units. It will be furthermore clear from Figure 2 that the clamping effect of the U-bolt, being transmitted largely through the solid bottom wall of the cup, has no substantial tendency to distort the cylindrical wall which provides one of the races for the roller bearings.

With the parts of the universal joint dismantled, assembly thereof into the complete joint illustrated in Figures 1 and 2 may be effected in the following manner. Spider or cross 13 is first positioned with trunnions 14 thereof extending loosely into rings 16 of yoke 12. Bearing units 17 are then fitted into the yoke rings 16 over the ends of trunnions 14 and are secured in place in any well known manner, as for example, by means of a snap ring or the like. Bearing units 21, comprising cup races 22 lined with needle bearings 23, are then mounted on spider trunnions 15.

Yoke 11 is then advanced toward spider 13 in an endwise direction until bearing race cups 22 are received within pockets 29 and seat against shoulders 31. During the assembly of yoke 11 a tool as, for example, a C-clamp, may be used to squeeze the bearing units 21 on trunnions 15 against the resistance of ring gaskets 24 in order to facilitate the operation, although use of such a tool is not essential. Finally, U-bolts 35 are fitted against the bearing race cups with the legs of the bolts extending through bores 34 in the yoke arm, and nuts 38 are turned on the ends of the bolts to securely clamp the bearing units 21 in place. The universal joint is thus completely assembled and may be dismantled by reversing the operations just described.

It will be appreciated that the present invention affords a construction which may be conveniently assembled and dismantled by virtue of the fact that yoke 11 may be secured or withdrawn in an endwise direction relative to spider 13, thereby eliminating intricate assembling operations. It is further seen that pocket openings 29 in yoke 11, together with the abutment shoulders 31 thereon formed, insure proper alignment of both yoke 11 and bearing units 21 relative to trunnions 15 without the necessity of special alignment keys or tongues. In additions, abutment shoulders 31 insure proper positioning of the bearing cups with relation to the joint center to provide desirable clearance over the spider trunnions.

In shipping the universal joint before final assembly, the parts of the joint are preferably assembled and packed in the following manner. Spider 13 is first assembled with respect to yoke 12 and bearing units 21 are mounted upon spider trunnions 15 in the manner previously described. A shipping strap 41 is then tightly looped about bearing units 21, as seen in Figures 8 and 10, to secure the bearing units in assembled position upon spider 13.

Shipping strap 41 comprises a main body portion 42 having at one end a tongue 43 and at its other end a slot 44. Body portion 42 of the strap is provided at intervals with apertures 45. Upon packing of the universal joint for shipment, strap 41 is looped about bearing units 21 with apertures 45 disposed over the edges of the bearing race cups 22, and tongue 43 is drawn tightly through slot 44 and bent back upon itself to lock the strap against inadvertent loosening. Cooperation of apertures 45 with the edges of the bearing race cups secures the strap against slipping or sliding and insures proper assembled relation of the parts at all times.

When it is desired to complete the assembly of the universal joint with yoke 11, strap 41 is removed by withdrawing tongue 43 from slot 44 and slipping the strap off from the bearing units 21. Yoke 11 may then be mounted upon the spider 13 and secured in place by means of U-bolts 35 in the manner previously described.

If desired bearing units 21 may be lubricated in a single operation when originally assembled upon spider 13 and before shipping strap 41 is secured in place. Subsequent removal of the shipping strap and assembly of the end yoke in no way disturbs the bearing units 21 since the latter are held in place upon the spider under the influence of the vacuum created in the bearing race cups and due to the lubricant therein packed. The need for lubrication of the bearing subsequent to the original assembly of the bearing units upon spider 13 is thus eliminated.

It will be seen from the foregoing description that the present invention provides a universal joint construction which may be readily assembled or dismantled, which insures alignment and proper positioning of the joint bearings, and which may be compactly and conveniently packed for storage or shipment.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a universal joint, a yoke member including a pair of arms terminating in spaced relation, the spaced extremities of said arms being provided with aligned laterally-open recesses, stop shoulders formed on said arms beyond and overhanging said recesses, a spider having a pair of trunnions having cups including bearings mounted thereon and seated within said bearing recesses and against said shoulders, U-shaped clamps embracing said cups and contacting the major area of one side of each of said cups and the area opposite the bottom wall of each cup and having threaded ends passing through said arms for retaining said cups within said recesses under said shoulders, and nuts threaded on said ends to apply a clamping force exerted largely through the bottom wall of each cup whereby distortion of the cup is avoided.

2. A universal joint including a member having a laterally open recess therein of semi-cylindrical shape and an integral shoulder overhanging said recess, a trunnion having a cup containing bearings telescoped on the trunnion, said cup having one side seated in said recess and held on said trunnion by contact with said shoulder, and a U-shaped clamp having a wide band-like bridge portion substantially covering the other side of said cup and the cup wall opposite the bottom of the cup, the legs of said U being threaded and extending through said first named member at opposite sides of the recess therein approximately in alinement with the cup bottom, and nuts threaded on said legs to clamp said cup in said recess beneath said shoulder by a clamping force exerted mainly through said bottom whereby distortion of the cylindrical cup wall is avoided.

JOHN W. B. PEARCE.